US009225817B2

(12) United States Patent
Goodwin

(10) Patent No.: US 9,225,817 B2
(45) Date of Patent: Dec. 29, 2015

(54) METHOD AND APPARATUS FOR PROVIDING MOTION ACTIVATED UPDATING OF WEATHER INFORMATION

(75) Inventor: Michael Goodwin, Raleigh, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 2186 days.

(21) Appl. No.: 12/139,947

(22) Filed: Jun. 16, 2008

(65) Prior Publication Data

US 2009/0313587 A1 Dec. 17, 2009

(51) Int. Cl.
*G06F 3/0481* (2013.01)
*H04M 1/725* (2006.01)
*G06F 1/16* (2006.01)

(52) U.S. Cl.
CPC ......... *H04M 1/72519* (2013.01); *G06F 1/1616* (2013.01); *G06F 1/1626* (2013.01); *G06F 1/1647* (2013.01); *G06F 1/1684* (2013.01); *G06F 2200/1637* (2013.01)

(58) Field of Classification Search
USPC ........................................................ 715/863
See application file for complete search history.

(56) References Cited

U.S. PATENT DOCUMENTS

| | | | | | |
|---|---|---|---|---|---|
| 5,825,352 | A * | 10/1998 | Bisset | ...................... | G06F 3/044 345/157 |
| 6,466,232 | B1 * | 10/2002 | Newell | ..................... | G06F 1/163 345/3.1 |
| 6,816,154 | B2 * | 11/2004 | Wong | .................... | G06F 1/1626 345/156 |
| 6,985,837 | B2 * | 1/2006 | Moon | ............... | G06F 17/30873 345/419 |
| 7,084,775 | B1 * | 8/2006 | Smith | ..................... | G01W 1/00 340/601 |
| 7,093,693 | B1 * | 8/2006 | Gazdzinski | ............. | B66B 1/468 187/384 |
| 7,181,345 | B2 * | 2/2007 | Rosenfeld | ............. | H04L 69/329 702/1 |
| 7,586,032 | B2 * | 9/2009 | Louis | ................... | G11B 5/5582 700/94 |
| 7,725,216 | B2 * | 5/2010 | Kim | ........................ | G07C 5/008 701/1 |
| 7,778,792 | B2 * | 8/2010 | Huang | ................... | G06F 1/1626 702/141 |
| 7,817,078 | B2 * | 10/2010 | Bunch | ..................... | G01S 7/003 342/176 |
| 7,822,513 | B2 * | 10/2010 | Wulff | ..................... | G01P 13/00 701/1 |
| 7,873,349 | B1 * | 1/2011 | Smith | ............... | H04M 1/72577 455/410 |
| 7,873,422 | B2 * | 1/2011 | Dumas | ..................... | G06F 8/10 700/29 |
| 7,882,435 | B2 * | 2/2011 | Kretz | ................... | G11B 27/105 700/94 |
| 2003/0048260 | A1 * | 3/2003 | Matusis | ............... | G06F 3/0233 345/173 |
| 2003/0085870 | A1 * | 5/2003 | Hinckley | ............. | G06F 1/1626 345/156 |
| 2004/0043760 | A1 * | 3/2004 | Rosenfeld | ............. | H04L 69/329 455/414.3 |
| 2004/0145613 | A1 * | 7/2004 | Stavely | ................. | G06F 1/1626 715/863 |
| 2004/0216054 | A1 * | 10/2004 | Mathews | ............. | G06F 9/4443 715/765 |
| 2005/0085272 | A1 * | 4/2005 | Anderson | ......... | H04M 1/72525 455/566 |

(Continued)

FOREIGN PATENT DOCUMENTS

WO WO 2005/093550 A2 10/2005

OTHER PUBLICATIONS

International Preliminary Report on Patentability dated Sep. 21, 2010 issued in corresponding PCT application No. PCT/US2009/043926, 9 pages.

(Continued)

*Primary Examiner* — Reza Nabi
(74) *Attorney, Agent, or Firm* — Tucker Ellis LLP; Morris Galin; Michael Hudzinski

(57) ABSTRACT

An approach provides updating of weather information on a mobile device. Motion of a mobile device is detected, wherein the mobile device is configured to execute a weather application for presenting weather information to a user. Update of the weather information is retrieved in response to the detected motion.

18 Claims, 7 Drawing Sheets

(56) References Cited

U.S. PATENT DOCUMENTS

| | | | |
|---|---|---|---|
| 2005/0114800 A1* | 5/2005 | Rao | H04M 1/72544 715/867 |
| 2005/0154798 A1* | 7/2005 | Nurmi | G06F 1/1626 710/1 |
| 2005/0212758 A1* | 9/2005 | Marvit | G06F 1/1613 345/156 |
| 2006/0256074 A1* | 11/2006 | Krum | G06F 1/1626 345/156 |
| 2006/0267783 A1* | 11/2006 | Smith | G01W 1/00 340/601 |
| 2007/0276295 A1* | 11/2007 | Shugg | G01C 22/006 600/595 |
| 2008/0001770 A1* | 1/2008 | Ito | G06F 1/1626 340/669 |
| 2008/0034321 A1* | 2/2008 | Griffin | G06F 1/1626 715/799 |
| 2008/0132213 A1* | 6/2008 | Rittman | H04L 67/04 455/414.3 |
| 2008/0168367 A1* | 7/2008 | Chaudhri | G06F 3/04817 715/764 |
| 2008/0168368 A1* | 7/2008 | Louch | G06F 3/048 715/764 |
| 2008/0280641 A1* | 11/2008 | Kristensson | G06F 1/1626 455/556.1 |
| 2008/0280642 A1* | 11/2008 | Coxhill | G06F 1/1626 455/556.1 |
| 2009/0005071 A1* | 1/2009 | Forstall | G06F 3/0481 455/456.1 |
| 2009/0100384 A1* | 4/2009 | Louch | G06F 1/1626 715/863 |
| 2009/0167678 A1* | 7/2009 | Orr | G01C 21/36 345/156 |
| 2009/0209293 A1* | 8/2009 | Louch | H04M 1/6041 455/566 |
| 2009/0239573 A1* | 9/2009 | Kretz | G11B 27/105 455/550.1 |
| 2009/0262074 A1* | 10/2009 | Nasiri | A63F 13/06 345/158 |
| 2009/0303204 A1* | 12/2009 | Nasiri | A63F 13/06 345/184 |
| 2009/0313587 A1* | 12/2009 | Goodwin | G06F 1/1616 715/863 |
| 2009/0316671 A1* | 12/2009 | Rolf | H04W 4/02 370/338 |
| 2010/0007518 A1* | 1/2010 | Kang | G06F 3/017 340/12.22 |
| 2010/0033422 A1* | 2/2010 | Mucignat | G06F 1/1626 345/156 |
| 2010/0079499 A1* | 4/2010 | Scott | G06F 3/04883 345/661 |
| 2010/0149094 A1* | 6/2010 | Barnes | G01W 1/02 345/156 |

OTHER PUBLICATIONS

International Search Report dated Oct. 29, 2009 issued in corresponding PCT application No. PCT/US2009/043926, 14 pages

* cited by examiner

METHOD AND APPARATUS FOR PROVIDING MOTION ACTIVATED UPDATING OF WEATHER INFORMATION

BACKGROUND

Applications for mobile devices continue to provide greater and greater functionality. In addition to conventional voice capabilities, these devices permit users to acquire information (e.g., weather information) from a variety of content sources. Unfortunately, as the richness and complexity of these applications increase, the complexity of the user interface increases commensurately. For example, the user may be required to launch one or more applications, and navigate through a series of menus (and requiring various user inputs) to obtain the desired information. This can be particularly cumbersome and inconvenient for the user, as user controls on mobile devices are generally small, and thus difficult to manipulate. Further, the maze of menus can require significant time to navigate through, thereby deterring the user from obtaining the information.

SOME EXEMPLARY EMBODIMENTS

Therefore, there is a need for an approach for providing efficiently retrieving content, such as weather information, on a mobile device.

According to one embodiment of the invention, a method comprises detecting motion of a mobile device, wherein the mobile device is configured to execute a weather application for presenting weather information to a user. The method also comprises retrieving update of the weather information in response to the detected motion.

According to another embodiment of the invention, an apparatus comprises a processor configured to execute a weather application for presenting weather information to a user. The apparatus also comprises a motion detector configured to detect motion of a mobile device, wherein update of the weather information is retrieved in response to the detected motion.

According to yet another embodiment of the invention, a method comprises receiving a request, over a wireless network, to update weather information from a weather widget resident on a mobile device, wherein the request is initiated based upon detection of motion of the mobile device concurrent with user input via the mobile device.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENTS

An apparatus, method, and software for providing motion activated updating of weather information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to presentation of weather information, it is recognized by one of ordinary skill in the art that the embodiments of the inventions have applicability to any type of content.

Figure 1:
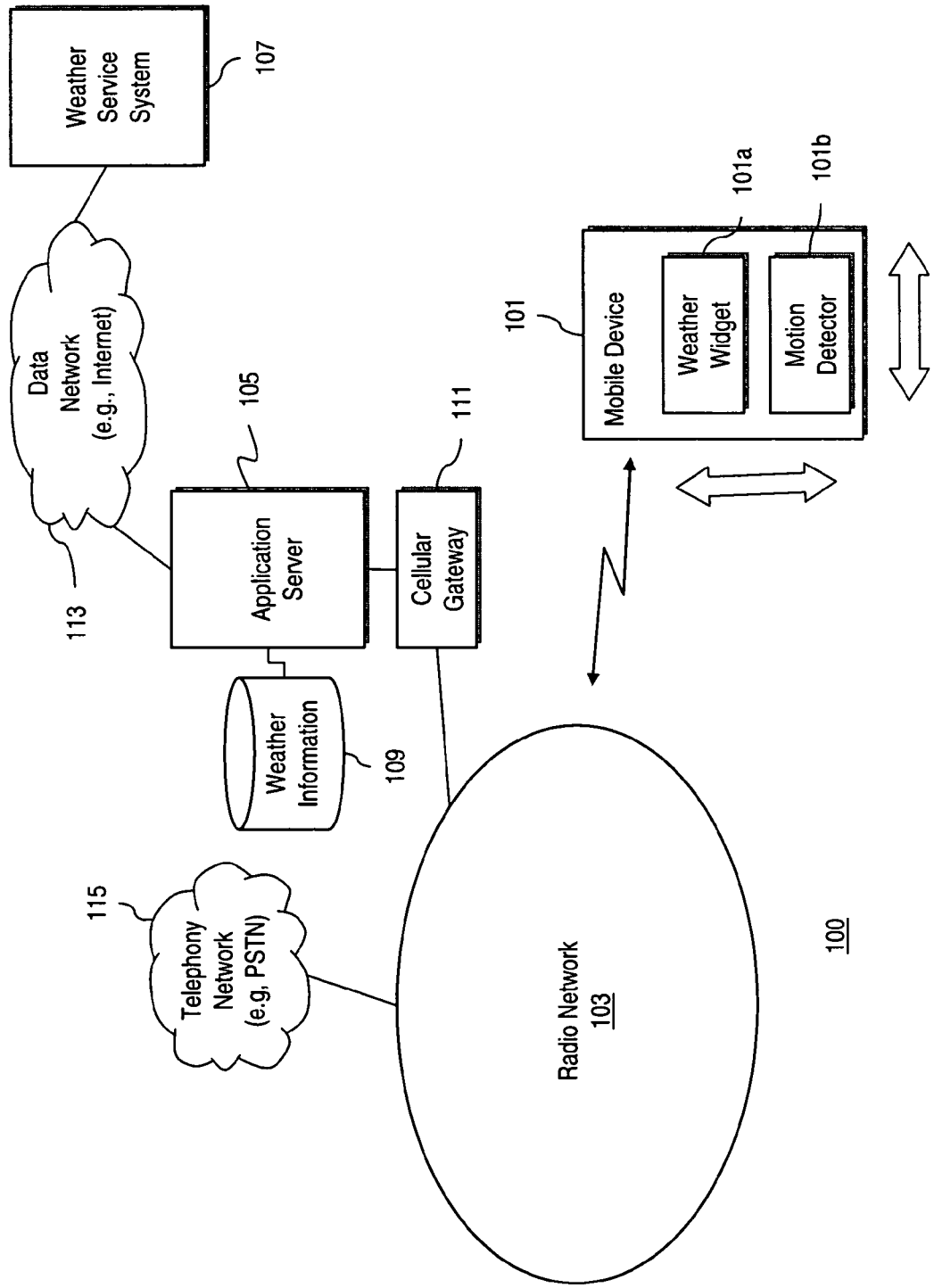
FIG. 1 is a diagram of a communication system supporting a mobile device that is capable of providing updates of weather information by movement of the mobile device, according to an exemplary embodiment.

FIG. 1 is a diagram of a communication system supporting a mobile device that is capable of providing updates of weather information by movement of the mobile device, according to an exemplary embodiment. For the purposes of illustration, a mechanism for updating weather information is described with respect to a communication system 100 that includes a mobile device 101 operating in a radio network 103, such as a cellular network. Thus, the mobile device 101 can include telephony capabilities for conducting voice communications. In addition, the mobile device 101 can execute a variety of applications, such as a weather widget 101a. In one embodiment, the mobile device 101 utilizes a motion detector 101b for detecting a certain level and/or type of motion (e.g., shaking) to trigger update of weather information for the weather widget 101a. It is contemplated that the mobile device 101 can be any type of electronic device, such as a laptop, personal digital assistant (PDA), web appliance, etc.

By way of example, the network 103 may employ various technologies including, for example, code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

As seen in FIG. 1, an application server 105 can interact with the weather widget 101a to supply the weather information by interfacing with a weather service system 107. The application server 105 maintains a database 109 of weather information retrieved from the weather service system 107. The data within the database 109 can thus be downloaded by the mobile device 101 via application server 105 and a cellular gateway 111. The application server 105 communicates with the weather service system 107 over a data network 113. The weather service system 107, for example, can be a third party system (e.g., Accu-Weather™) that provides worldwide weather forecasting services. The data network 113 may be any local area network (LAN), metropolitan area network (MAN), wide area network (WAN), the Internet, or any other suitable packet-switched network, such as a commercially owned, proprietary packet-switched network, e.g., a proprietary cable or fiber-optic network.

The radio network 103 has connectivity to a telephony network 115, such as a Public Switched Telephone Network (PSTN), to allow the mobile device 101 to establish voice communications with terminals served by the telephony network 115.

Although the mobile device 101 is shown to include a weather widget 101a, it is recognized that other applications can be employed to present weather information to the user. A widget, a contraction of "window gadget," refers to components in a graphical user interface (GUI). A widget can be considered an on-screen representation of a control that may be manipulated by the user; widgets, include, for example, scroll bars, buttons, and text boxes. Accordingly, the weather widget 101a provides an on-screen representation of a weather control, by which the user can obtain weather information.

As mentioned, conventionally, with mobile devices, the user is required to invoke a variety of commands and traverse various menus to retrieve data. Consequently, the user is disinclined to access such data at all.

In recognition of the above drawback, the mobile device 101 of system 100 is capable of conveniently accessing and presenting the user with content, such as weather information, through a simple "shake" of the mobile device 101. In an alternative embodiment, the user can gain immediate access to updated weather widgets displayed on the mobile device 101 by activating and continuing to activate a user control input while simultaneously shaking the mobile device 101.

Figure 2A:
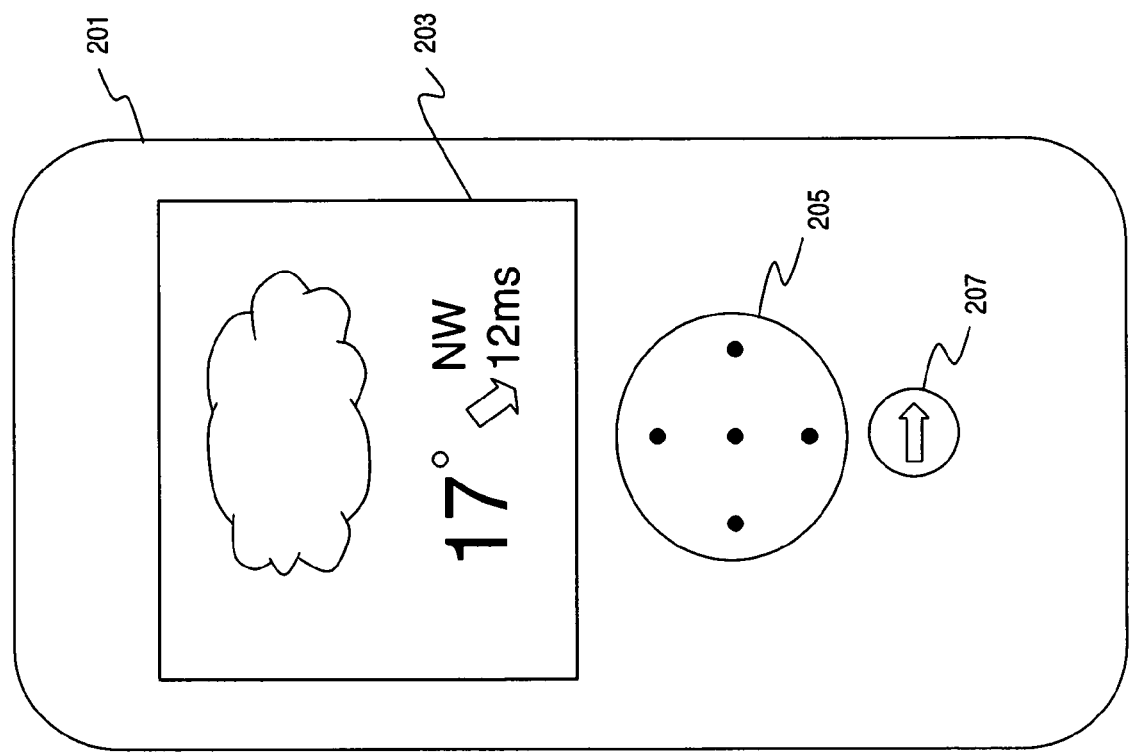
FIGS. 2A-2C are diagrams of exemplary mobile device configurations for displaying a weather widget, according to various exemplary embodiments.
Figure 2C:
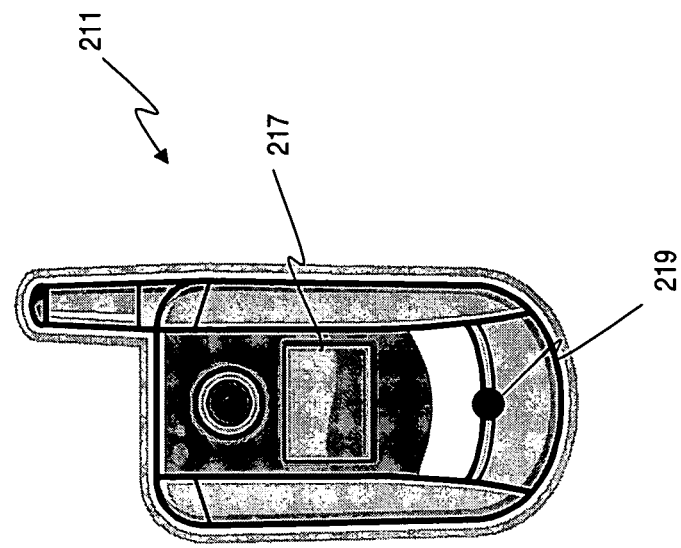
Figure 2B:
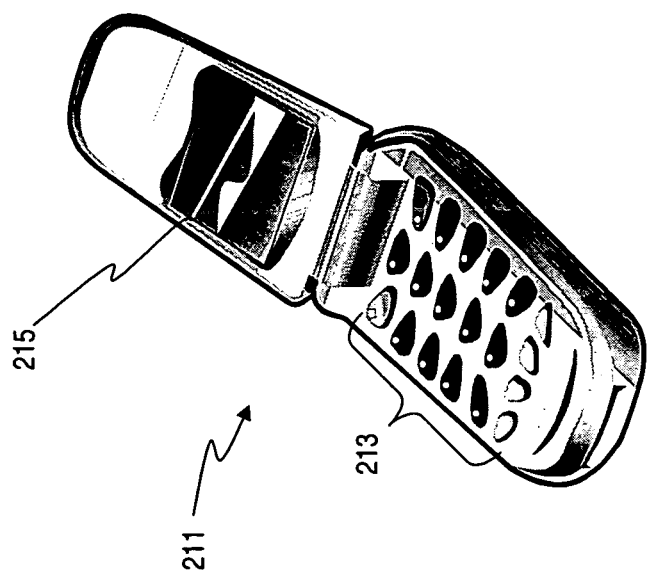

FIGS. 2A-2C are diagrams of exemplary mobile device configurations for displaying a weather widget, according to various exemplary embodiments. As shown in FIG. 2A, mobile device 201 is in form of a mobile phone, which provides a display 203 of a weather widget 101a. The device 201 also includes a cursor controller 205 as well as an input button 207. In an exemplary embodiment, the display 203 can update the weather information by having the user depress button 207 while concurrently moving (e.g., shaking) the mobile device 201. That is, the button 207 is activated during the movement of the mobile device 201. Moreover, the mobile phone 201 may employ a "soft" (or virtual) keyboard or key pad, in which a soft button is assigned (in combination of the shaking) for invoking the update of the weather information.

FIGS. 2B and 2C illustrate a flip-phone (or "calm shell") type mobile telephone in an open position and a closed position, respectively. In the open position, the mobile telephone 211 permits access to a keyboard 213 in its lower portion and a main display 215 in its upper portion. As such, the weather widget 101a can be presented via the main display 215. Furthermore, in the closed position, the mobile telephone 211 provides an exterior display 217, in which the weather widget 101a can be conveniently presented to the user.

Also, in the closed configuration, a user input control button 219 can be provided; this button 219 can be activated or depressed (while the mobile telephone 211 is shaken) to invoke the display of updated weather information. The user input control button 219 may be located at any convenient location on the mobile telephone 211. Also, such button 219 may be made a part of the keyboard 213. Alternatively, any one of the keyboard buttons can be assigned for the purposes of triggering the update of the weather information.

Figure 3A:
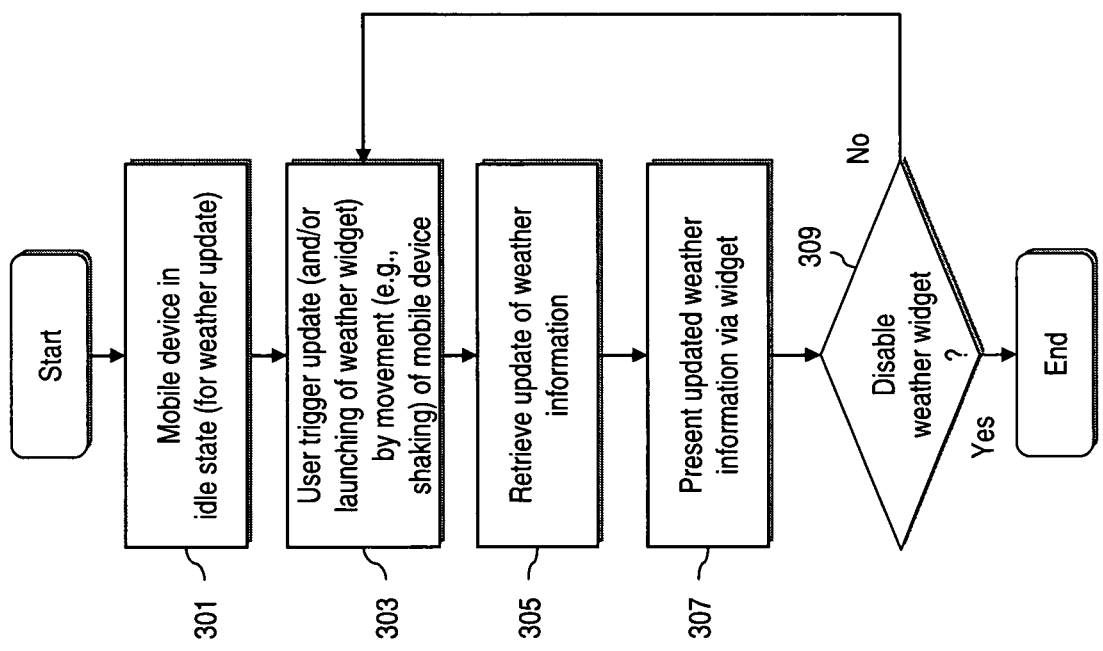
FIGS. 3A and 3B are flowcharts of processes for updating weather information on a mobile device, according to various exemplary embodiments.
Figure 3B:
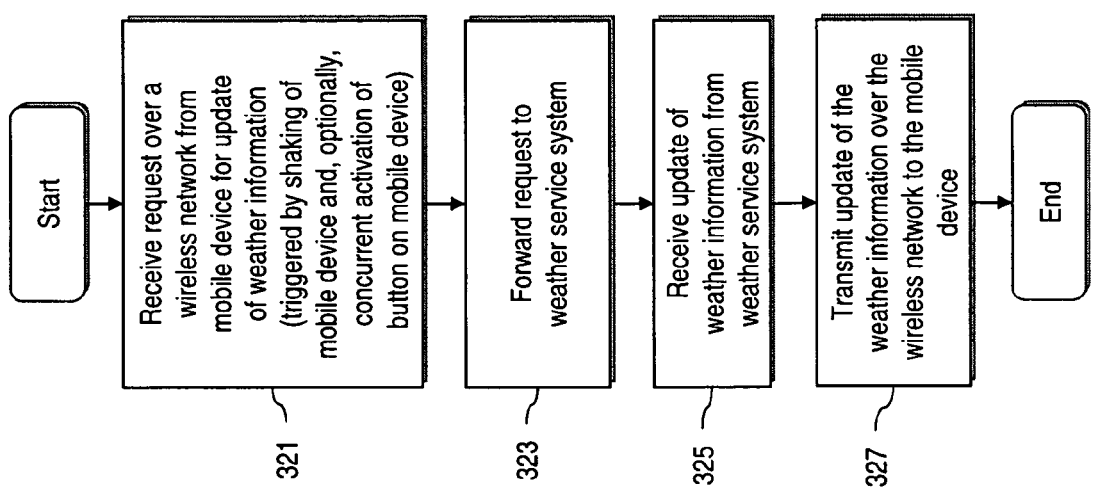

FIGS. 3A and 3B are flowcharts of processes for updating weather information on a mobile device, according to various exemplary embodiments. These processes are described with respect to the system 100 of FIG. 1. In step 301, the mobile device 101 in an "idle" state in so far as the weather widget 101a is concerned. At some point, the user triggers update and/or launch of the weather widget 101a by moving (e.g., shaking) the mobile device 101, per step 303. It is noted that the amount or intensity of motion, in an exemplary embodiment for initiating the update process, can be set by the user. For example, a thresholding mechanism can be employed, whereby only certain amount of motion will trigger an update, as explained below in FIG. 4. In this manner, "false" activations can be avoided. Such false activations can be further reduced by requiring the user to depress a button or key (as earlier described). Next, the update of the weather information is performed, as in step 305, and presented to the user (step 307). The user can indefinitely have the weather widget 101a activated, whereby subsequent updates are initiated by detection of a triggering movement of the mobile device 101. However, the user can, at any point, disable the weather widget 101a so that functions relating to motion detection, etc. are not executed (step 309).

On the network side (as shown in FIG. 3B), the application server 105 receives, as in step 321, a request from the mobile device 101 for updating of the weather information. This request is submitted in response to the shaking of the mobile device 101 by the user. In turn, the application server 105 forwards the request to the weather service system 107, per step 323. It is noted that the application server 105 may, on its own, periodically maintain updated weather information, so that communication with the weather service system 107 need not contribute to the delay in the updating process. In step 325, the update is received from the weather service system 107. Thereafter, the application server 105 transmits the updated weather information to the mobile device 101 (step 327).

Figure 4:
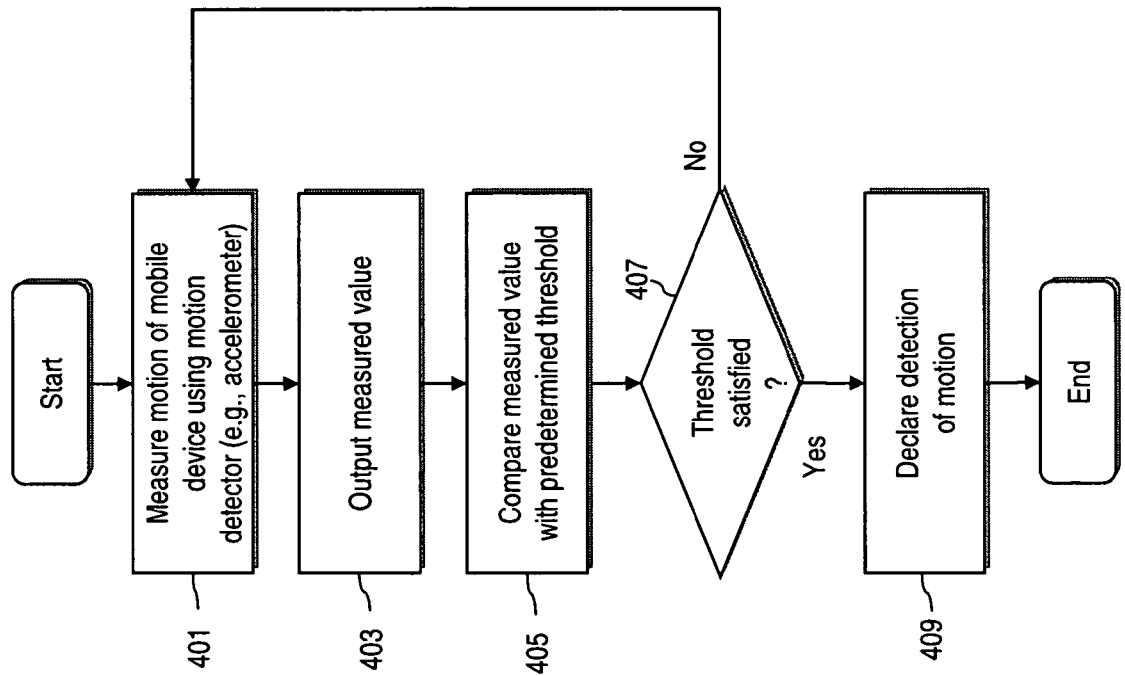
FIG. 4 is a flowchart of process for detecting motion of a mobile device, according to various exemplary embodiments.

FIG. 4 is a flowchart of process for detecting motion of a mobile device, according to various exemplary embodiments. To determine what movements are sufficient to invoke the updating processes of FIGS. 3A and 3B, the mobile device 101 utilizes a motion detector 101b to measure the motion experienced by the mobile device 101 (step 401). In step 403, the motion detector 101b outputs a value indicative of the level of lateral and/or vertical movements. Next, the measured value is compared, as in step 405, to a predetermined threshold. As mentioned, this threshold can be set by the user. It is then determined, per step 407, whether the threshold has been satisfied. According to one embodiment, this determination can factor in the duration of the motion; for instance, rapid movement can result in satisfaction of the threshold. If the threshold has been satisfied, then a triggering motion is declared, per step 409.

In the above motion detection process, it is noted that if the user is required to depress a button on the mobile device 101 concurrently (or simultaneously) with shaking, then the threshold can be reduced to permit even smaller movements to trigger the update.

Figure 5:
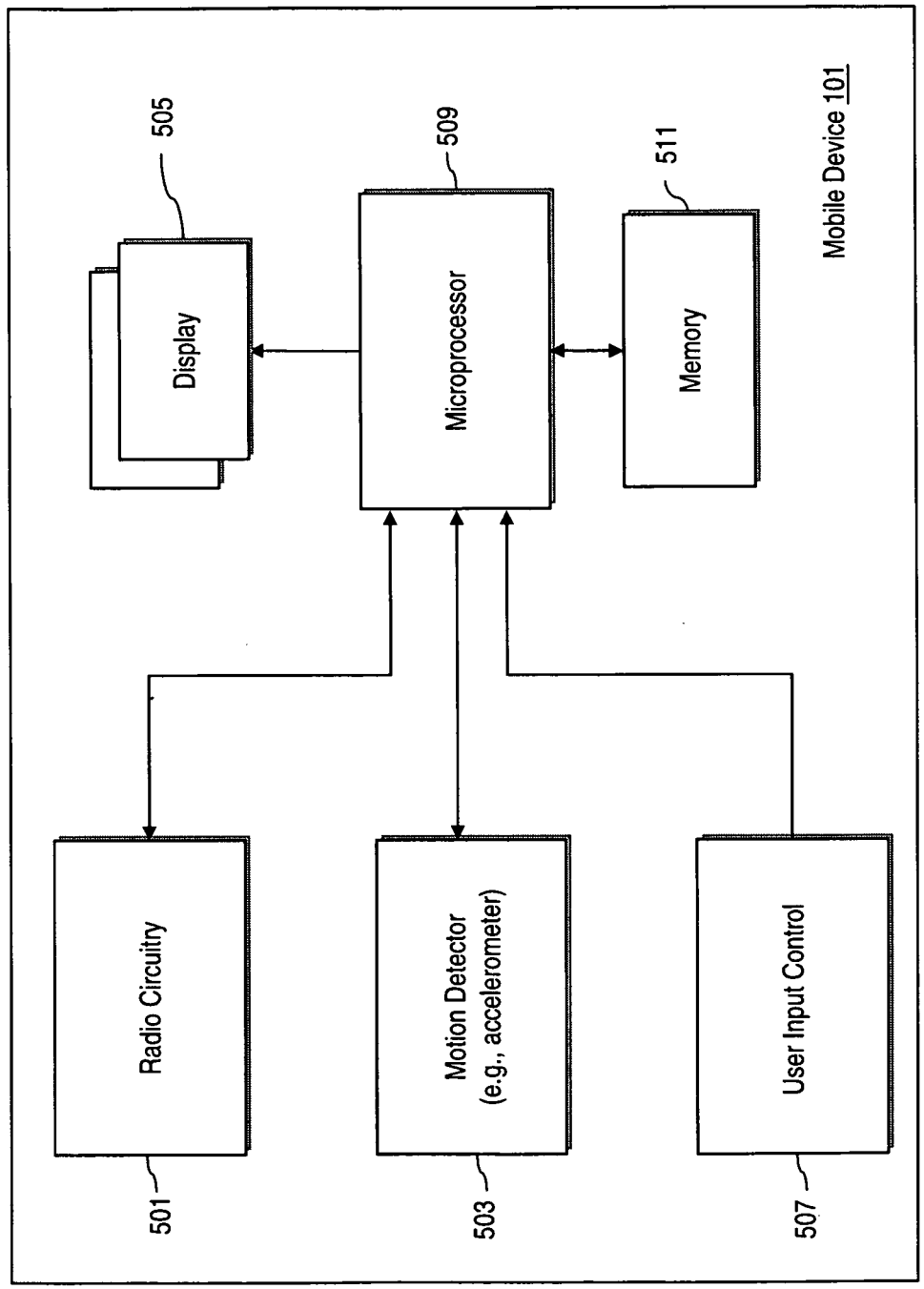
FIG. 5 is a diagram of exemplary components of the mobile device of FIG. 1, according to an exemplary embodiment.

FIG. 5 is a diagram of exemplary components of the mobile device of FIG. 1, according to an exemplary embodiment. In this example, the mobile device 101 includes radio circuitry 501 for communicating over the radio network 103 and a motion detector (e.g., accelerometer) 503 for measuring motion of the mobile device 101. Additionally, a display 505 is provided to present the weather widget 101a; alternatively, multiple displays can be utilized (as in the mobile telephone 211 of FIGS. 2B and 2C).

A user input control button or switch (i.e., input device) 507, such as a keyboard including alphanumeric and other keys, is coupled to a bus for communicating information and command selections to a microprocessor 509. Other types of user input device 507 includes a cursor control, a trackball, or cursor direction keys, for communicating direction information and command selections to the microprocessor 509 and for controlling cursor movement on the display 505.

The user input control button or switch 507 allows a user to provide input in connection with the invocation of the weather information updating process. In summary, the accelerometer 503 provides information as to whether the mobile device 101 is being moved, e.g., shaken; and the user input control button or switch 309 provides the information as to whether this input control button or switch is being depressed.

The microprocessor 509 processes signals for controlling the display 505 as to permit the display 505 to present an updated weather widget after processing input signals received from the radio circuitry 501, the accelerometer 503, and the user input control button or switch 309. The microprocessor 509 executes instructions stored in memory 511 to support the weather application. Memory 511 can be random access memory (RAM) or other dynamic storage device. Also, memory 511 can be used for storing temporary variables or other intermediate information during execution of instructions by the microprocessor 509. Such instructions can be read into memory 511 from another computer-readable storage medium (not shown). Execution of the arrangement of instructions contained in memory 511 causes the microprocessor 509 to perform the process steps described herein. One or more processors in a multi-processing arrangement may also be employed to execute the instructions contained in memory 511. In alternative embodiments, hard-wired circuitry may be used in place of or in combination with software instructions to implement certain embodiments. Thus, these embodiments are not limited to any specific combination of hardware circuitry and software.

The term "computer-readable storage medium" as used herein refers to any medium that participates in providing instructions to the microprocessor 509 for execution. Such a medium may take many forms, including but not limited to non-volatile media, volatile media. Non-volatile media include, for example, optical or magnetic disks, such as the storage device. Volatile media include dynamic memory, such as memory 511. Common forms of computer-readable storage media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, or any other medium from which a computing system or microprocessor 509 can read.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   detecting motion of a mobile device, by the mobile device, wherein the mobile device is configured to execute a weather application for presenting weather information to a user;
   receiving input from the user;
   determining whether the input is provided during the motion; and
   retrieving an update of the weather information in response to the detected motion and a determination that the input is provided during the motion.

2. A method according to claim 1, wherein the input is provided by the user via a hard button or a soft button on the mobile device.

3. A method according to claim 1, wherein the weather application includes a weather widget.

4. A method according to claim 1, further comprising:
   presenting the update of the weather information to the user via the weather application.

5. A method according to claim 4, wherein the weather information is presented on a display of the mobile device, the display being on an exterior of the mobile device.

6. A method according to claim 1, wherein the motion involves shaking the mobile device either laterally, vertically, or a combination thereof.

7. A method according to claim 1, further comprising:
   measuring the motion to output a value of the motion;
   comparing the measured value with a predetermined threshold; and
   declaring detection of the motion if the measured value satisfies the predetermined threshold.

8. A tangible computer-readable storage device including one or more sequences of one or more instructions which, when executed by one or more processors, cause the one or more processors to perform the method of claim 1.

9. An apparatus comprising:
   a processor configured to execute a weather application for presenting weather information to a user;
   a motion detector configured to detect motion of a mobile device; and
   a user interface configured to receive input from the user, wherein the processor is further configured to:
      determine whether the input is provided during the motion, and
      initiate retrieval of updated weather information if the input is provided during the motion.

10. An apparatus according to claim 9, wherein the input is provided by the user via a hard button or a soft button on the mobile device.

11. An apparatus according to claim 9, wherein the weather application includes a weather widget.

12. An apparatus according to claim 9, further comprising:
   a display configured to present the update of the weather information to the user via the weather application.

13. An apparatus according to claim 12, wherein the display is on an exterior of the mobile device.

14. An apparatus according to claim 9, wherein the motion involves shaking the mobile device either laterally, vertically, or a combination thereof.

15. An apparatus according to claim 9, wherein the motion detector is configured to measure the motion to output a value of the motion, the processor being further configured to compare the measured value with a predetermined threshold, and to declare detection of the motion if the measured value satisfies the predetermined threshold.

16. A method comprising:
   receiving a request, over a wireless network, to update weather information from a weather widget resident on a mobile device,
   wherein the request is initiated based upon detection of motion of the mobile device, by the mobile device, concurrently with user input via the mobile device.

17. A method according to claim 16, further comprising:
forwarding the request to a weather service system;
receiving the update from the weather service system; and
transmitting the update to the mobile device or presentation of the update to a user via the weather widget.

18. A tangible computer-readable storage device including one or more sequences of one or more instructions which, when executed by one or more processors, cause the one or more processors to perform the method of claim 16.

* * * * *